July 29, 1969
E. E. COOK
3,457,941
UNLOADER VALVE
Filed Oct. 4, 1965
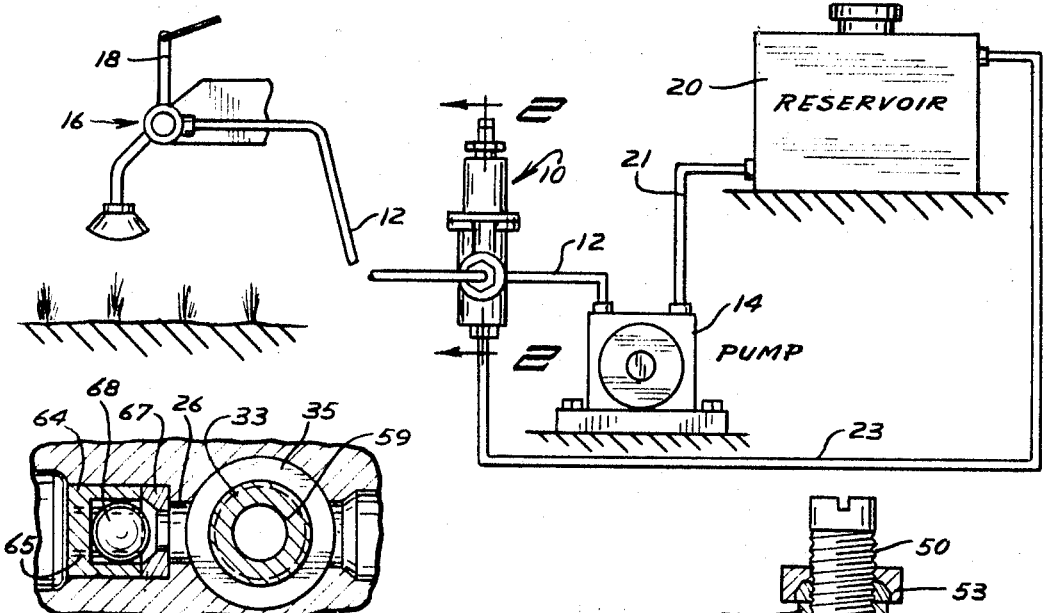
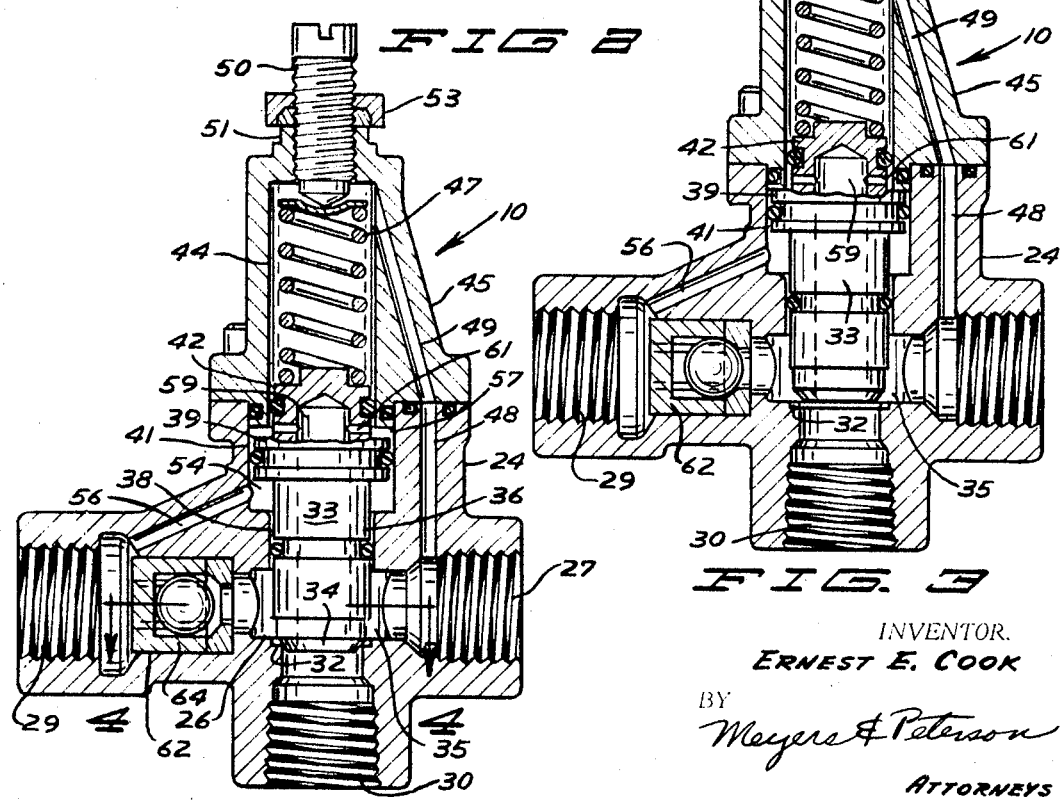
INVENTOR.
ERNEST E. COOK
BY
Meyers & Peterson
ATTORNEYS 3,457,941
UNLOADER VALVE
Ernest E. Cook, Anoka, Minn., assignor to Hypro, Inc., Minneapolis, Minn., a corporation of Ohio
Filed Oct. 4, 1965, Ser. No. 492,753
Int. Cl. F04d 27/00, 49/08; G05d 16/04
U.S. Cl. 137—108                                2 Claims

ABSTRACT OF THE DISCLOSURE

An unloader valve adapted to control fluid flow between a main flow line and to either an outlet line, or a branch line, the unloader valve having a plunger which is arranged to be stable in either a first position blocking said branch line, or in a second position providing communication between said main flow line and said branch line. Means for biasing said plunger toward said closed position include a spring together with an hydraulic force obtained from the main flow line, and in opposition to this force, means are provided for communication between said plunger and the outlet line. Hunting by the plunger is eliminated by virtue of the application of force from the pressure in said main flow line in opposition to the spring biasing means.

---

This invention relates to the art of fluid handling and more particularly the invention pertains to an unloader valve for opening a bypass or return line upon the occurrence of an overpressure condition in a main fluid supply line due, for example, to a closing of a delivery nozzle downstream from the unloader valve.

The unloader valve of this invention has particular utility in fluid systems containing shutoff valves which are repeatedly opened and closed while a pump for the system continues to run. It will be understood that the invention also has utility in any fluid system in which an overpressure condition is apt to occur. An agricultural power sprayer may be cited as an example of a system in which the invention may be used. Such systems normally have a supply or reservoir tank for the fluid to be sprayed and a pump for pressurizing the fluid for delivery to the spray nozzles. A shutoff valve is provided for starting and stopping the spray flow or controlling delivery as desired. In systems of this kind, the pump is continuously operated so that the fluid will begin to flow immediately upon opening of the shutoff valve and an unloader valve is used to direct the fluid back to the supply tank when the shutoff valve is closed so that the pump need not work or operate against the high back pressure of a closed line condition.

Conventional unloader valves generally employ a spring-biased valve plug which is acted on directly by the pressure of the fluid in the main discharge line to the sprayers. Upon closure of the shutoff valve, the pressure in the line increases and the force of the spring is overcome so that the valve plug moves to uncover or open the bypass line. During the bypass operation, the pump must continuously work against the spring and consequently the pressure in the line must remain at the level dictated by the spring force. Occasionally, severe chattering of the valve results during the time when the unloader valve is either open or closed.

It is an object of the present invention to provide an unloader valve for a fluid handling system of the class described which valve is quickly responsive to an increase in pressure produced by closure of a downstream valve in the main fluid line to relieve that condition and unload the pump. Moreover, it is a further object of the invention to provide an unloader valve structure which will also close quickly to reestablish flow through the main fluid line upon an opening of that line.

Another object of the invention is to provide an unloader valve which is bistable in operation, having one stable position in which the bypass is closed and another stable position in which the bypass is open and in which the pressure or force in the line in the bypass condition of the valve need not work solely against the force of the spring. In this manner, the magnitude of the back pressure on the pump during operation is minimized.

Other objects, advantages and new features of the invention will become apparent upon consideration of the following detailed description when read in the light of the accompanying drawings, wherein:

FIGURE 1 is a diagrammatic showing of a fluid system utilizing the present valve;

FIGURE 2 is a vertical cross section through the unloader valve taken on the line 2—2 of FIGURE 1;

FIGURE 3 is a vertical cross section similar to the showing of FIGURE 2, but illustrating the valve plunger in its open condition; and FIGURE 4 is a sectional view taken along the line 4—4 of FIGURE 2 through the movable elements of the valve, illustrating in section the axial bore through the valve plunger.

The valve of the invention is illustrated at 10 in FIGURE 1, as interposed along a fluid line 12 between a pump 14 and a sprayer generally indicated at 16. It will be understood that the sprayer 16 includes a conventional shutoff valve which may be operated from a remote point by means of the line attached to the upper end of lever 18. A tank or reservoir 20 is connected to the pump 14 over a line 21 to supply the fluid to be sprayed. Completing the fluid system is a bypass line 23 extending between the valve 10 and the reservoir 20 which acts to return the bypassed fluid from the valve 10 when the shutoff valve is closed.

FIGURE 2 illustrates the internal construction of the present unloader valve. As there shown, the valve 10 consists of a main body portion 24 having a main flow passageway 26, connected between an inlet port 27 and an outlet port 29. The ports 27 and 29 are internally threaded as shown so that they may be connected into the fluid line 12 to complete that line. Main housing 24 also has a branch channel 30 therein, adapted to be connected to line 23, and defining at its juncture with the main passageway 26 a valve seat 32.

Under normal operating pressure conditions in the main passageway 26, the relief port 30 is closed by a valve plunger or plug 33 which extends across the main passageway 26 into contact with valve seat 32. As indicated in FIGURE 4, the passageway 26 is enlarged around the valve plunger 33 to provide an annular flow passage 35 around the plunger 33.

Valve plunger 33 is supported in main housing 24 for reciprocating movement toward and away from valve seat 32. As shown, the valve plunger 33 has a shank portion 36 which is received in sealing relation in a bore 38 in housing 24, and a piston flange 39 in an enlarged bore 41 in the housing 24. The valve plunger 33 also has a coaxial upper shank portion 42 which is received in a bore 44 in an auxiliary housing 45 which is attached to the main housing 24 by suitable fasteners. Conventional O-ring seals are provided between the various parts as shown.

Valve plunger 33 is normally biased downwardly into engagement with valve seat 32 by means of a spring 47 housed within the bore 44 and by fluid pressure supplied from the main flow passageway 26 to the bore 44 over auxiliary lines 48 and 49 in main housing 24 and auxiliary housing 45, respectively. By adding the fluid pressure to the force of spring 47, any transient fluctuations of pressure in main passage 26 will have less tendency to open the valve or to cause it to chatter. The pressure required to open the valve may be adjusted by varying the position of the anchor point of the spring 47 by means of an adjusting screw 50 threadedly engaged in the top portion 51 of the auxiliary housing 45. A lock nut 53 may also be provided if desired.

Fluid pressure is supplied to the zone 54 within bore 41 below the flange 39 through a passage 56 communicating between the main flow passage 26 near the outlet port 29 and the zone 54. The zone 57 above the flange 39 is vented to the branch channel 30 by means of a central through-bore 59 and a transverse communicating bore 61 in the upper shank portion 42 of valve plunger 33.

Completing the assembly of the valve is a ball check valve 62 interposed in the main flow passage 26 between the location of the valve plug 33 and the outlet port 29. The check valve 62 is of conventional construction having a ball-retaining housing 64 provided with slotted fluid passageways 65, a valve seat 67 and a valve ball 68. As the parts are oriented in the drawings, the check valve 62 will permit flow from right to left through the valve but will be moved against seat 67 by the higher pressure in the downstream portion of line 12 when the cutoff valve is closed, to restrict flow from left to right through the valve.

Considering now the operation of the present unloader valve, it will be apparent that when the downstream valve is open to permit flow from the system, check valve ball 68 will be moved to the left as seen in FIGURE 2 to permit fluid to flow through the passages 65 in the retainer 64. Under flowing conditions, the pressure in the downstream end of the main passageway 26 near the outlet 29 is relatively low and the combined force of the spring 47 and the fluid pressure in the bore 44 will be sufficient to counteract the force on the lower side of the piston flange 39 to hold the valve plunger 33 in its lower or closed position. When the branch channel 30 is under pressure, as it is in some systems, the through bore 59 aids in holding the plunger in its down or closed position and thus prevents chattering by imposing the fluid pressure existing in the branch channel on the top surface of the flange 39. As noted above, the through bore will also act as a vent for the zone above the piston flange to permit upward movement of the valve plug 33.

When the downstream valve 16, for example, is closed, the flow through the main passage 26 will stop and the pressure will build up in the downstream end of the valve. This pressure buildup will cause a lifting of valve plug 33 so as to permit the ball 68 of the check valve 62 to move to the right into closing relation against its seat 67 to hold the higher pressure in the downstream line and therefore will also impose this pressure on the zone 54 below the flange. Fluid will then begin to enter the branch channel and the back pressure on the pump will not increase as liquid returns to the tank 20 over line 23. The valve plunger rises until the top surface of the flange 39 engages the bottom of the auxiliary housing 45 and will be held firmly in this position as long as the downstream cutoff valve and check valve 62 remain closed to maintain the higher relative presusre in zone 54. The upper position of valve plunger 33 is illustrated in FIGURE 3. It will be noted that the fluid pressure in the main line 12 and bypass line 23 do not work against the force of spring 47 and the back-pressure on the pump is thereby minimized.

Upon opening of the cutoff valve, the downstream pressure will suddenly drop, allowing ball 68 to move to its open condition and permitting valve plunger 33 to move downwardly to close the bypass channel. Now the valve plunger will be held firmly by the combined forces of spring 47, the pressure in bore 44 and the branch channel pressure in the zone 57.

It will thus be apparent that good bistable operation is achieved in the present unloader valve and that, in particular, the bypass line need not work against a spring. Consequently, less back pressure is imposed on the pump and the over-all efficiency of the system is increased.

I claim:

1. An unloader valve adapted to be inserted in a main flow line upstream of a shutoff valve to divert flow to a branch line in response to closure of said shutoff valve and to reestablish flow in said main flow line upon opening of said shutoff valve comprising a housing having a main flow passage extending therethrough from an inlet port to an outlet port and a branch channel intersecting with said main flow passage intermediately thereof, a valve plunger having a radial piston flange thereon mounted for reciprocatory sliding movement in said housing and being normally resiliently biased into blocking relation to said branch channel, said housing having means defining a cylinder operatively associated with said piston flange and passage means located in said cylinder on the side of said piston flange toward the main flow passage and communicating between said cylinder and said main flow passage near said outlet port for imposing the pressure sensed at a point near said outlet port onto said valve plunger for opening the same, and a ball check valve interposed in said main fluid passage at a location upstream of the intersection of said passage means with said main flow passage and downstream of said branch channel, the ball of said check valve being arranged to move axially in said main flow passage to block said main flow passage in response to an increase in pressure in said outlet port whereby such increase in pressure will be maintained in said outlet port upon opening movement of said valve plunger, said valve plunger extending across said main flow passage into closing relation to said branch channel, said main flow passage being enlarged at the location of said branch channel to provide an annular flow passage around the valve plunger, said valve plunger having a shank portion slidingly and sealingly engaging a first bore in said housing between said cylinder and said main flow passage and having a coaxial upper shank portion in sliding sealed relation to a second bore in said housing extending from the side of said cylinder opposite said first bore, said second bore having a closed end, a spring housed within said second bore bearing against said valve plunger providing said normal resilient bias to hold the same in blocking relation to said branch channel, said valve plunger having a blind coaxial bore extending from the branch channel blocking end thereof to a terminus near the other end thereof and a radial bore having a cross-sectional area which is small relative to the cross-sectional area of said flow passages for providing restricted fluid communication between the open end of said blind coaxial bore and said cylinder on the side of said piston flange opposite from said main flow passage whereby said cylinder is vented to permit motion of said valve plunger out of blocking relation to said branch channel and whereby pressure in said branch channel will be imposed on said piston flange when said valve plunger is in branch channel blocking relation to aid in maintaining that relation.

2. An unloader valve as defined in claim 1, wherein the pressure imposed on said plunger from said sensing point is imposed on a certain first transverse area of said valve plunger constituting the side of said piston flange toward the main flow passage, and wherein said housing also has passage means therein extending between said main flow passage near said inlet port and said second bore, whereby the fluid pressure in said main flow passage near said inlet port is imposed on a certain second transverse area constituting the end of said valve plunger to supplement the force of said spring biasing said plunger toward its said blocking position and to oppose the force from the pressure imposed from said sensing point, with said first transverse area being greater than said second transverse area, so as to render said valve plunger relatively insensitive to transient fluctuations in pressure in said main flow passage.

References Cited

UNITED STATES PATENTS

| | | | |
|---|---|---|---|
| 2,086,295 | 7/1937 | Ernst | 137—108 X |
| 2,183,889 | 12/1939 | Magnuson | 137—108 |
| 2,420,394 | 5/1947 | Gilman | 137—108 |
| 2,420,890 | 5/1947 | MacDuff | 137—108 |
| 3,140,722 | 7/1964 | Gordon | 137—108 |

CLARENCE R. GORDON, Primary Examiner

D. J. ZOBKIW, Assistant Examiner